June 19, 1962 F. PILTZ ETAL 3,040,224
SWITCHING CIRCUIT FOR CONTROLLING SHAKER TABLE MOTOR
Filed Aug. 13, 1957
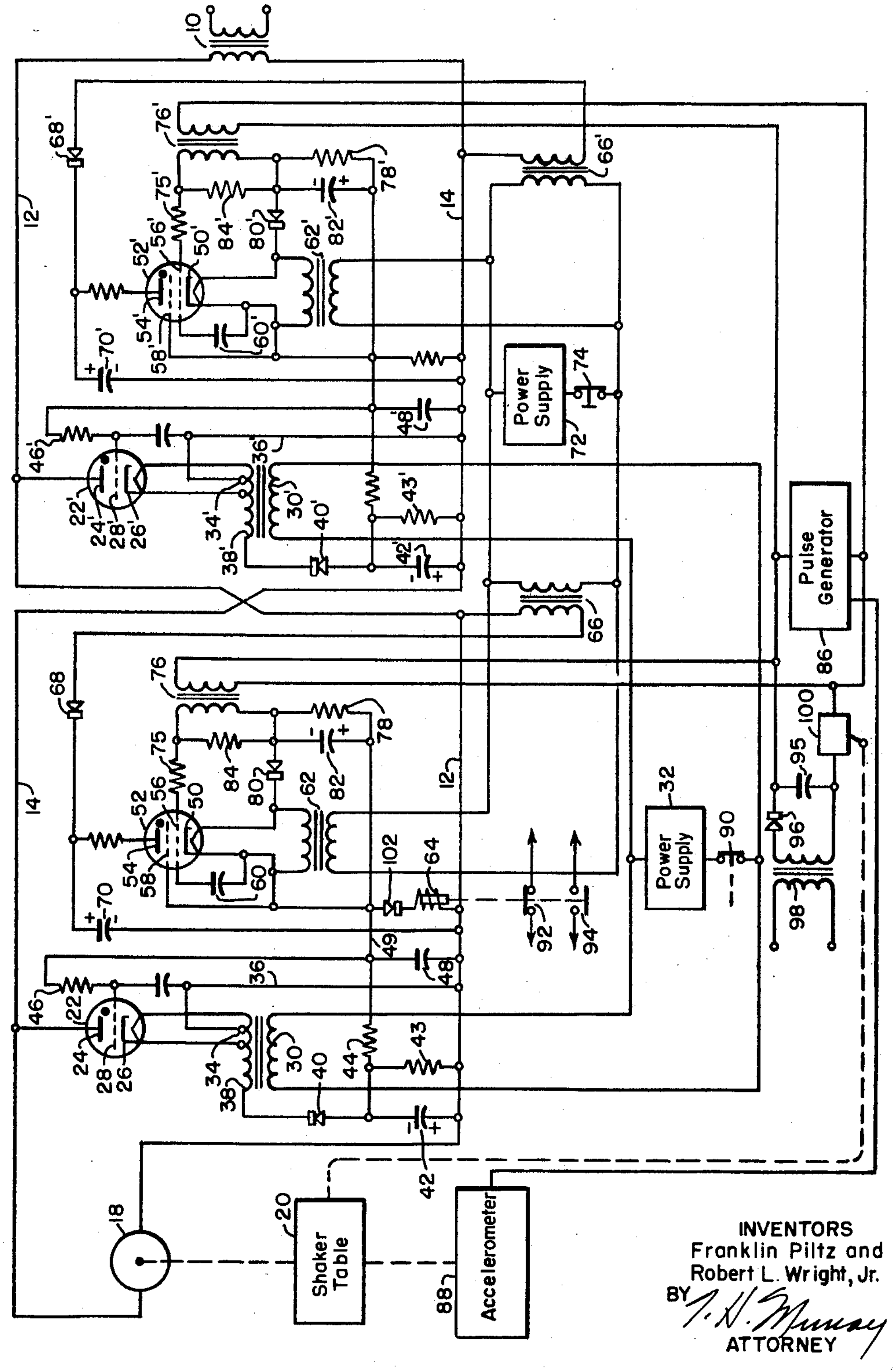
INVENTORS
Franklin Piltz and
Robert L. Wright, Jr.
BY T. H. Murray
ATTORNEY 3,040,224
Patented June 19, 1962

3,040,224

SWITCHING CIRCUIT FOR CONTROLLING SHAKER TABLE MOTOR

Franklin Piltz, Catonsville, and Robert L. Wright, Jr., North Linthicum, Md., assignors to Westinghouse Electric Corporation, East Pittsburgh, Pa., a corporation of Pennsylvania Filed Aug. 13, 1957, Ser. No. 677,937
6 Claims. (Cl. 318—132)

This invention relates to apparatus for rapidly shorting electrical conductors and more particularly to apparatus for shorting electrical conductors carrying alternating-current energy to apparatus which must be disconnected from a power source instantaneously upon the existence of certain predetermined conditions.

In vibration testing, either random noise in the frequency range of 30 to 5,000 cycles per second or a single frequency is fed into a high power amplifier of up to 70 kva. output and then into a vibration shaker table. Under certain operating conditions, transients may be introduced into the system which will cause the shaker table to exceed its limit of travel or exceed its allowable acceleration, thereby resulting in damage to the shaker and test load. Accordingly, it becomes necessary to provide some means for short circuiting the conductors connecting the power amplifier with the shaker table driving means in as short a period of time as is possible when an allowable limit is exceeded and to maintain said short circuit until the power amplifier is disconnected from a power source.

Accordingly, it is an object of this invention to provide a device which will short-circuit the power supply for a shaker table in as short a time as possible when an allowable operating condition is exceeded.

More generally, an object of the invention is to provide means for shorting two electrical conductors upon the existence of certain predetermined conditions.

Another object of the invention is to provide a pair of gaseous discharge tubes connected in back-to-back relationship across a pair of conductors carrying alternating-current voltage, together with means for controlling conduction in the gaseous discharge tubes.

Another object of the invention is to employ the voltage existing across the secondary winding of the filament transformer for a gaseous discharge tube to control conduction through the tube.

A still further object of the invention is to provide a new and novel switching circuit employing a gaseous discharge tube.

The above and other objects and features of the invention will become apparent from the following detailed description taken in connection with the accompanying single FIGURE drawing, which illustrates the invention in schematic circuit form.

Referring to the drawing, there is shown a transformer 10 having a primary winding adapted for connection to a power amplifier or other source of alternating-current energy, not shown. The secondary winding of transformer 10 is connected to a pair of electrical conductors 12 and 14, which, in turn, are connected to the armature 18 of a shaker table 20, the arrangement being such that when alternating-current energy is supplied to the armature 18, the shaker table 20 will be caused to oscillate.

As shown, the conductors 12 and 14 cross in the middle portion of the drawing so that conductor 14 is at the top of the drawing on the left-hand side of the figure, whereas it is located at the bottom of the drawing on the right-hand side. Similarly, conductor 12 is at the top of the drawing on the right-hand side and at the bottom of the drawing on the left-hand side. Since the conductors 12 and 14 carry alternating-current energy, means must be provided to short-circuit current flowing in either direction between conductors 12 and 14. For this purpose, a pair of gaseous discharge tubes 22 and 22' are connected in back-to-back relationship between the conductors. Since the arrangement of each of the gaseous discharge tubes 22 and 22' and its associated circuitry are identical, only the tube 22 will be described in detail, corresponding elements for tube 22' being indicated by like primed reference numerals.

Tube 22 includes an anode 24, an indirectly heated cathode 26 and a control electrode 28. Anode 24 is connected directly to conductor 14, whereas the cathode 26 is connected between spaced points on the secondary winding of a filament transformer 30. The primary windings of transformers 30 and 30' are connected in parallel with a common source of voltage 32; however, they could be connected in series with a power source if so desired. Point 34 on the secondary winding of filament transformer 30 is connected to conductor 12 through lead 36, while end tap 38 of the same secondary winding is connected to conductor 12 through rectifier 40 and capacitor 42. Thus, the voltage on the secondary winding of transformer 30 between points 34 and 38 is applied across the series combination of rectifier 40 and capacitor 42. Consequently, due to the rectifying action of rectifier 40, a voltage will be produced across capacitor 42 with the polarity indicated in the drawing. Resistor 43, connected in shunt with capacitor 42, acts as a bleeder resistor which discharges the capacitor 42 when the unit is deenergized, thereby preventing service personnel from receiving a shock due to retained charge on the capacitor.

The junction of rectifier 40 and capacitor 42 is connected through resistors 44 and 46 to the control electrode 28 of discharge tube 22. Thus, due to the negative voltage existing at the junction between rectifier 40 and capacitor 42, the potential on the control electrode 28 is negative with respect to cathode 26; and tube 22 is normally cut-off. As shown, the junction of resistors 44 and 46 is connected to conductor 12 through capacitor 48. This same junction is connected via lead 49 to the cathode 50 of a second gaseous discharge device 52 which includes an anode 54, control electrode 56 and screen grid 58. Screen grid 58 is connected directly to the cathode 50; whereas control grid 56 is connected to the same cathode through capacitor 60. The cathode 50 is also connected to the secondary winding of a filament transformer 62, one terminal of which is connected to conductor 12 through the energizing coil of a relay 64.

A source of driving potential for tube 52 is provided by means of transformer 66 and rectifier 68, the arrangement being such that the alternating current in the secondary winding of transformer 66 is rectified by rectifier 68 to produce a direct-current voltage between the anode and cathode of tube 52. In shunt with the secondary winding of transformer 66 and rectifier 68 is a capacitor 70, the purpose of which will hereinafter be described. As shown, the primary winding of the filament transformers 62, 62' and transformers 66, 66' are all connected in parallel across an alternating-current power supply 72. A manually operable switch 74 is provided to selectively disconnect the power supply 72 from the various transformers 62, 62', 66 and 66'.

Grid 56 of tube 52 is also connected to cathode 50 through resistor 75, the secondary winding of a transformer 76 and resistor 78, the arrangement being such that the voltages produced across the secondary winding of transformer 76 will vary the potential existing between grid 56 and cathode 50 and, thus, will control conduction through the tube. The opposite terminals of the secondary winding of transformer 62 are interconnected by a rectifier 80 and a capacitor 82. In this manner, the voltages produced across the secondary winding of transformer 62 will be rectified to produce a voltage across capacitor 82 with the polarity shown; and this voltage, in turn, will be applied to grid 56 in tube 52 through resistor 75 and resistor 84 in parallel with the secondary winding of transformer 76. Since the polarity of the voltage at the junction of rectifier 80 and capacitor 82 is negative, grid 56 will normally be negative with respect to cathode 50; and tube 52 will be cut off. However, by applying a positive pulse to grid 56 by means of transformer 76, conduction may be initiated in the tube.

The primary windings of transformers 76 and 76′ are connected in parallel with a pulse generator 86. The pulse generator 86 may be fired by accelerometer 88 or some other suitable device for sensing a condition of excessive acceleration of the shaker table 20, such that when the shaker table exceeds its maximum allowable limit of acceleration, the pulse generator 86 will apply a positive pulse to grids 56 and 56′ thereby initiating conduction in the tubes 52 and 52′.

In a similar manner, the same primary windings are connected across a capacitor 95 which is charged through rectifier 96 from a source of alternating current voltage, not shown, applied to the primary winding of transformer 98. The discharge of capacitor 95 into the primary windings of transformers 76 and 76′ is controlled by limit switch 100 which is closed in response to excessive travel of the shaker table 20.

In operation, power is supplied to the primary windings of transformers 30 and 30′ by a switch 90 which is automatically closed when the main power amplifier, not shown, is energized, said amplifier being connected to the primary winding of transformer 10. When switch 90 is thus closed, the voltage produced across the secondary windings of transformers 30 and 30′ will charge capacitors 42 and 42′ with the polarity shown, thereby providing a negative bias on the grids 28 and 28′ to prevent conduction through tubes 22 and 22′. After sufficient warm-up time, the manually operated switch 74 is closed to connect power supply 72 to the primary windings of filament transformers 62, 62′ and transformers 66, 66′. The resulting voltage produced across the secondary windings of transformers 62, 62′ charges capacitors 82, 82′ through rectifiers 80, 80′ with the polarity shown in the drawing. Consequently, the negative voltages at the junction of rectifiers 80, 80′ and capacitors 82, 82′ is applied to the grids 56, 56′ of tubes 52, 52′ thereby preventing conduction through these tubes. The voltage produced across the secondary windings of transformers 66, 66′ also charges capacitors 70, 70′ through rectifiers 68, 68′ with the polarity indicated. The circuit is now ready for operation.

If the shaker table 20 exceeds its allowable limit of travel or acceleration, pulse generator 86 or capacitor 95 will apply a positive pulse to the grids 56, 56′. Thus, tubes 52, 52′ fire and permit capacitors 70, 70′ to discharge into capacitors 48, 48′ and 42, 42′. This raises the potential on the cathodes 50, 50′, and since the cathodes 50, 50′ are connected to the grids 28, 28′ of tubes 22, 22′, the potential on these grids is raised also and tubes 22, 22′ fire. Thus, the required short circuit between conductors 12 and 14 is provided whenever limit switch 100 or accelerometer 88 triggers pulse generator 86 to supply a positive pulse to the grids 56, 56′. All of the tubes in the circuit may be cut off and the circuit reset by opening the manually operable switch 74 to disconnect the power supply 72 from the plate of tubes 52, 52′.

When the circuit is triggered and tubes 52, 52′ fire, the relay coil 64 will be energized. The normally closed contacts 92 of relay 64 control the plate supply of a power amplifier, not shown, which is connected to the primary winding of transformer 10. Thus, when the circuit is triggered, contacts 92 open to disable the power amplifier. Normally open contacts 94 are connected to an indicating device, not shown, so that when the contacts close, the indicating device will signal that the circuit has been triggered. Rectifier 102, in series with the operating coil of the relay 64, prevents oscillation of energy from capacitor 40 through the energizing coil of the relay.

Although the invention has been shown in connection with a certain specific embodiment, it will be readily apparent to those skilled in the art that various changes in form and arrangement of parts may be made to suit requirements without departing from the spirit and scope of the invention. For example, parallel-connected tubes, interconnected through a balancing reactor, could be used in place of each of the tubes 22 and 22′ for greater power handling capabilities. Likewise, a second relay, similar to relay 64, could be used in conjunction with tube 52′, for disabling the power amplifier and for indicating a triggered condition in the event relay 64 a tube 52 should fail.

We claim as our invention:

1. Apparatus for selectively shorting a pair of conductors carrying electrical energy to motor means actuating a shaker table comprising, in combination, a gaseous discharge device having an anode, cathode and control electrode, means electrically connecting said anode to a first of said conductors, a filament transformer for said discharge device having a secondary winding connected to said cathode, a pair of parallel current paths connecting spaced points on said secondary winding to a second of said conductors, one of said paths including a capacitor and a unidirectional current device, means connecting the junction of said unidirectional current device and said capacitor to said control electrode whereby said control electrode is normally maintained negative with respect to said cathode for maintaining said gaseous discharge device normally non-conducting, and means for raising the potential on said control electrode to fire said gaseous discharge device responsively to a predetermined movement condition of said shaker table.

2. Apparatus for selectively shorting a pair of conductors carrying electrical energy to motor means actuating a shaker table comprising, in combination, a first gaseous discharge device having an anode, cathode and control electrode, means electrically connecting said anode to a first of said conductors, a filament transformer for said discharge device having its secondary winding connected to said cathode, a pair of parallel current paths connecting spaced points on said secondary winding to a second of said conductors, one of said paths including a first capacitor and a unidirectional current device, means connecting the junction of said unidirectional current device and said first capacitor to said control electrode whereby said control electrode is normally maintained at a negative potential with respect to said cathode for maintaining said first gaseous discharge device normally cut off, a source of driving potential, a pair of parallel current paths connected across said source of driving potential, one of said last-named paths including a second gaseous discharge device and the other of said last-named paths including a second capacitor, a connection between the path including said second gaseous discharge device and the control electrode of said first gaseous discharge device, and means for initiating conduction in said second gaseous discharge device in response to a predetermined condition respective to movement of said shaker table whereby said second condenser is discharged to raise the potential of said control electrode to fire said first gaseous discharge device.

3. Apparatus for selectively shorting a pair of conductors carrying electrical energy to armature means actuating a shaker table comprising, in combination, a first gaseous discharge device electrically connected between said conductors, a control electrode included in said first gaseous discharge device, a current path including a first capacitor connecting said control electrode to one of said conductors, means for charging said first capacitor with a polarity which will maintain said first gaseous discharge device normally cut off, a second gaseous discharge device having an anode, cathode and control electrode included therein, a source of driving potential for the second gaseous discharge device, means connecting said anode to one terminal of said source of driving potential, means connecting said cathode to the other terminal of said source of driving potential, a second capacitor connected between said terminals, means connecting the cathode of said second gaseous discharge device to the control electrode of said first gaseous discharge device, and pulse productive means connected to the control electrode of said second gaseous discharge device to effect conduction therethrough responsively to a predetermined movement condition of said shaker table.

4. Apparatus for selectively shorting a pair of conductors carrying electrical energy to motor means actuating a shaker table comprising, in combination, a first gaseous discharge device electrically connected between said conductors, a control electrode for said first gaseous discharge device, a current path including a capacitor connecting said control electrode to one of said conductors, means for charging said capacitor with a polarity which will cut off conduction through said first discharge device, a second gaseous discharge device having an anode, cathode and control electrode, means connecting the cathode of said second device to the control electrode of said first device, a transformer having its primary winding adapted for connection to a source of alternating-current potential, a current path including the secondary winding of said transformer and a rectifier connecting the anode and cathode of said second discharge device, a capacitor connected in shunt with the portion of said last-named current path which includes said rectifier and secondary winding, a second transformer having primary and secondary windings, means connecting said secondary winding between the control electrode and cathode of said second discharge device, and means for connecting the primary winding of said second transformer to a source of voltage controlled according to movement of said shaker table.

5. Apparatus for selectively shorting a pair of conductors carrying alternating-current electrical energy to motor means actuating a shaker table comprising, in combination, a pair of gaseous discharge devices electrically connected in inverse parallel relationship between said conductors, a control electrode for each of said discharge devices, a first current path including a capacitor connecting the control electrode of one of said discharge devices to one of said conductors, an electron path including a second capacitor connecting the control electrode of the other of said discharge devices to said other conductor, means for charging said capacitors with polarities to cut off conduction in both of said discharge devices, and apparatus including gaseous discharge means for periodically changing the charge on each of said capacitors according to movement conditions of said movable member.

6. Apparatus for selectively shorting a pair of electrical conductors conveying electrical energy to a motor actuating a shaker table, comprising, in combination, a pair of gaseous discharge tube means in inverse parallel arrangement for short circuiting said conductors in shunt with said motor, means for maintaining said gaseous discharge tube means normally non-conducting, normally charged capacitor means and means for discharging said capacitor means to establish conduction of said gaseous discharge tube means responsively to an excessive operating condition of said shaker table.

References Cited in the file of this patent

UNITED STATES PATENTS

| | | |
|---|---|---|
| 2,312,982 | Stenning | Mar. 2, 1943 |
| 2,537,676 | Knauth et al. | Jan. 9, 1951 |
| 2,584,800 | Grisdale | Feb. 5, 1952 |
| 2,757,330 | Boyer et al. | July 31, 1956 |
| 2,780,763 | Hertwig | Feb. 5, 1957 |
| 2,859,388 | Chiasson | Nov. 4, 1958 |
| 2,862,151 | Van Ness | Nov. 25, 1958 |
| 2,935,671 | Ross | May 3, 1960 |